March 9, 1943.    R. F. ANDERSON    2,313,500
STICK DISPENSER
Filed April 8, 1942    3 Sheets-Sheet 1

Inventor:
Ralph F. Anderson
By
McCanna, Wintercorn & Morsbach
Attys

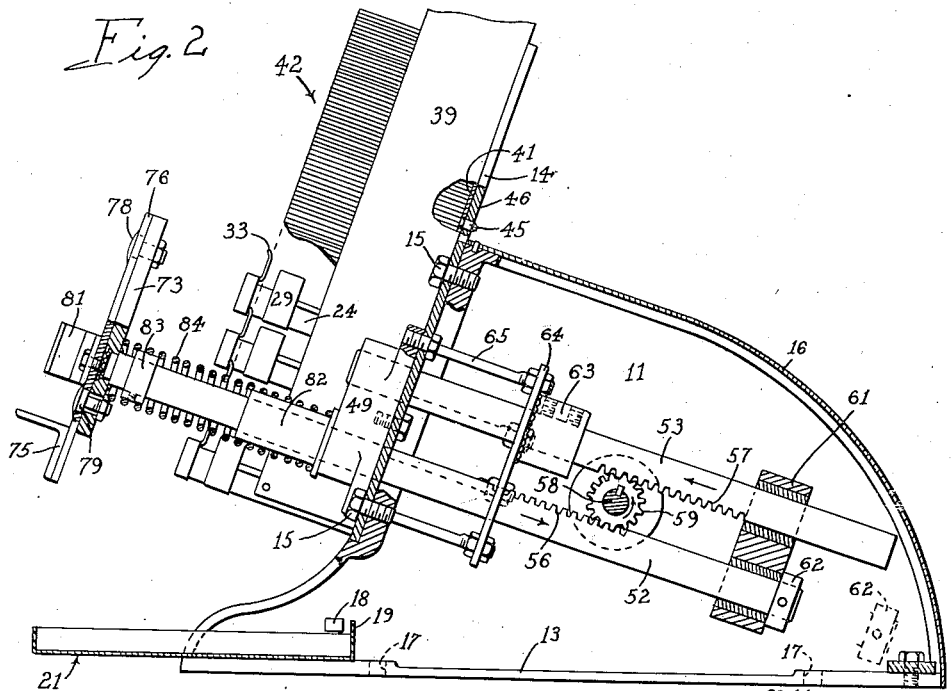
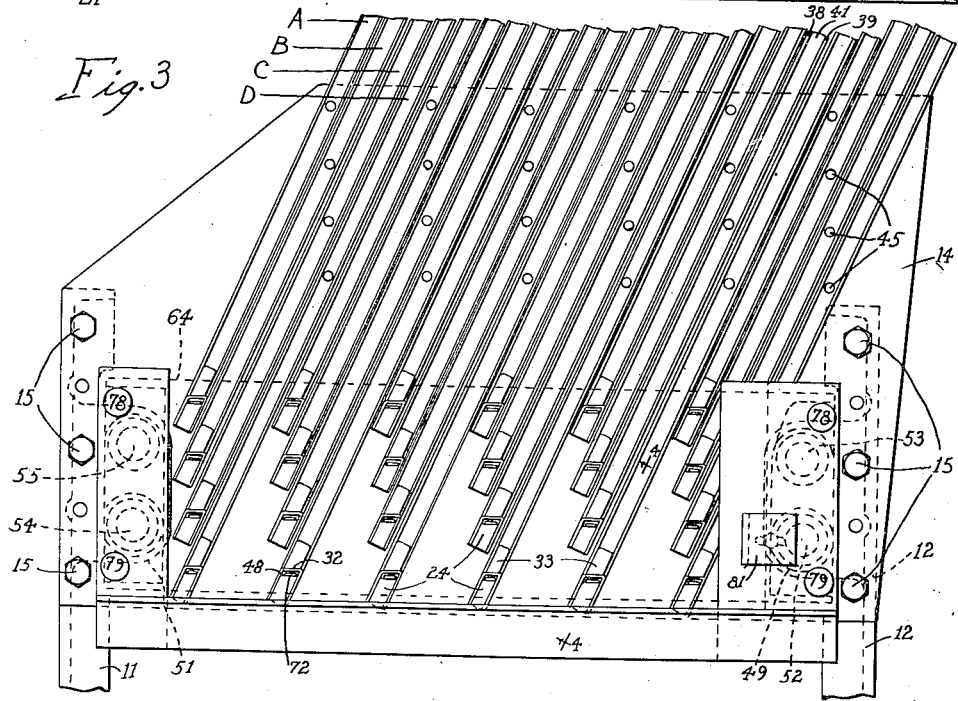

March 9, 1943.　　　R. F. ANDERSON　　　2,313,500
STICK DISPENSER
Filed April 8, 1942　　　3 Sheets-Sheet 3
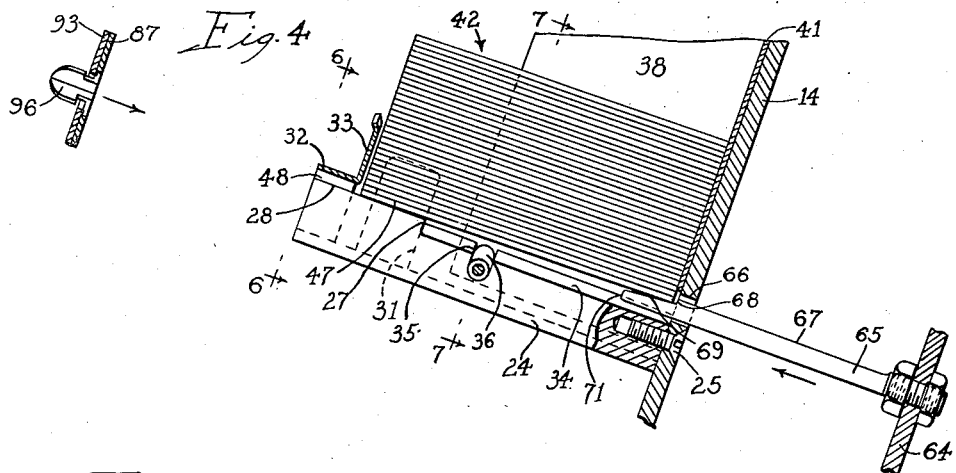
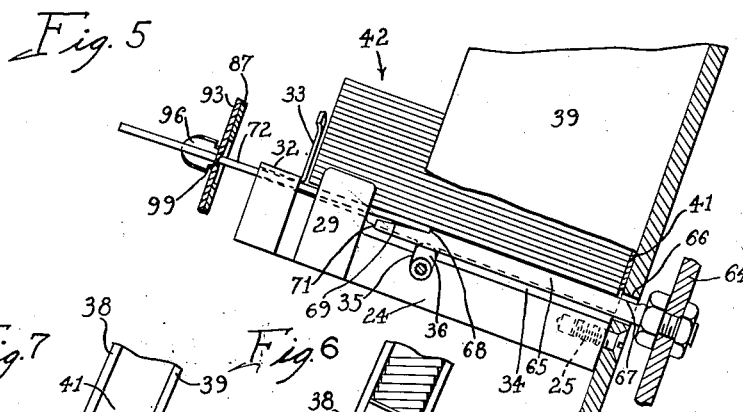
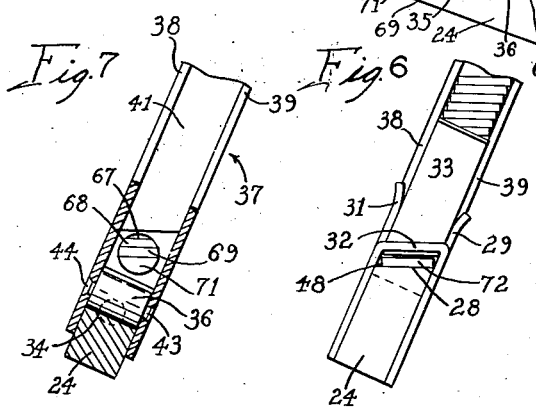
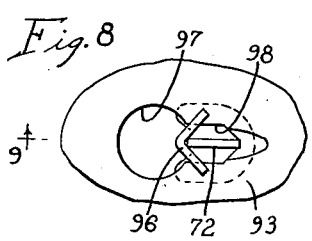
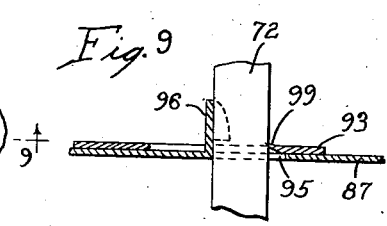
Inventor:
Ralph F. Anderson
By McCanna, Wintercorn & Morsbach
Attys.

Patented Mar. 9, 1943

2,313,500

UNITED STATES PATENT OFFICE 2,313,500

STICK DISPENSER

Ralph F. Anderson, Rockford, Ill.

Application April 8, 1942, Serial No. 438,109

16 Claims. (Cl. 107—7)

This invention relates to stick dispensers of the type adapted primarily for loading stick holders used in the manufacture of so-called stick confections such as ice cream bars held on the ends of sticks.

In the manufacture of stick confections gang molds are employed which are immersed in a refrigerating brine and a stick holder is disposed thereon adapted to hold sticks in suspended relation in each of the molds so that the confection will be frozen around one end of the sticks. In the case of ice cream confections, the frozen ice cream and sticks are removed from the molds by heating the molds slightly and thereafter the ice cream bar thus formed is dipped in chocolate and packed in suitable boxes or other containers. The slow point in the process is the step of inserting the sticks into the stick holders in such manner that the stick will be suspended centrally in the mold and at a suitable elevation with respect thereto so that the stick will be disposed in the center of the completed confection. Ordinarily the stick holders carry twenty-four sticks which are clamped in the holder in such manner as to be readily releasable for removal of the completed confection therefrom, and the stick holder is employed in transporting the confection during the process of manufacture. The problem of loading the holder is complicated by the fact that the sticks are conventionally wooden strips which tend to warp both longitudinally and transversely in highly irregular fashion, and this difficulty greatly aggravates the problem of machine loading because of the difficulty in clamping the sticks at one end so as to cause the other ends thereof to define a preselected pattern corresponding to central locations in the various cavities of the mold. Because of these difficulties the stick loading operations have in the past been largely hand operations, and where machine dispensing has been employed, the operation has been so erratic that many manufacturers have preferred to use manual operations.

An important object of the invention is the provision of a stick dispenser adapted to give more uniform and positive operation in the feeding and in the location of the sticks in the holder.

Another object of the invention is the provision of a dispenser wherein the sticks are positively held in parallelism adjacent opposite ends thereof while being locked in the holder so that when the holder is seated over a mold, the sticks will be all centered in the mold cavities despite any warpage or irregularity in the shape of the sticks.

A still further object of the invention is the provision of a stick dispenser which is actuated by means of the stick holder so as to simultaneously load a complete complement of sticks upon a single actuation, and wherein the parts are automatically repositioned when the stick holder is removed.

Another object of the invention is the provision of a dispenser in which the sticks are inserted into the stick holder from the bottom thereof so that both ends of the sticks are held in alignment during the loading operation.

I have also aimed to provide a dispenser which is adapted to be loaded with a supply of sticks from the front or working position of the machine, whereby the operator need not go to the back of the machine for loading and thereby permitting complete operation of the machine by a single operator.

I have also aimed to provide a dispenser having a plurality of stick magazines each adapted to serve a stick feeder and having stick feeders spaced vertically to insert the sticks of a single transverse row across the stick holder, the stick magazines being disposed at an acute angle with respect to the vertical so that the sticks will feed down of their own weight.

Another important object of the invention is the provision of a dispenser having a plurality of stick magazines removable for reloading and for cleaning.

A still further object of the invention is the provision of a dispenser wherein the sticks may be inserted into the holder substantially any desired distance and such that any conventional make or style of stick holder may be loaded thereby.

Other objects and advantages will appear from the following description and the accompanying drawings, in which—

Fig. 2 is a section on the line 2—2 of Figure 1 having additional parts broken away to show the features of the structure;

Fig. 3 is a fragmentary front view of the dispenser;

Fig. 4 is a fragmentary view on the line 4—4 of Fig. 3 showing a part of a stick holder disposed at the start of the loading movement;

Fig. 5 is a view similar to Fig. 4 showing the parts at the end of the loading movement;

Fig. 6 is a fragmentary view on the line 6—6 of Fig. 4 showing the front of a stick feeder;

Fig. 7 is a view on the line 7—7 of Fig. 4 showing the manner in which the stick magazines are supported;

Fig. 8 is a fragmentary bottom view of a stick holder showing the manner in which the stick is clamped in the holder, and Fig. 9 is a section on the line 9—9 of Fig. 8.

Figure 1:
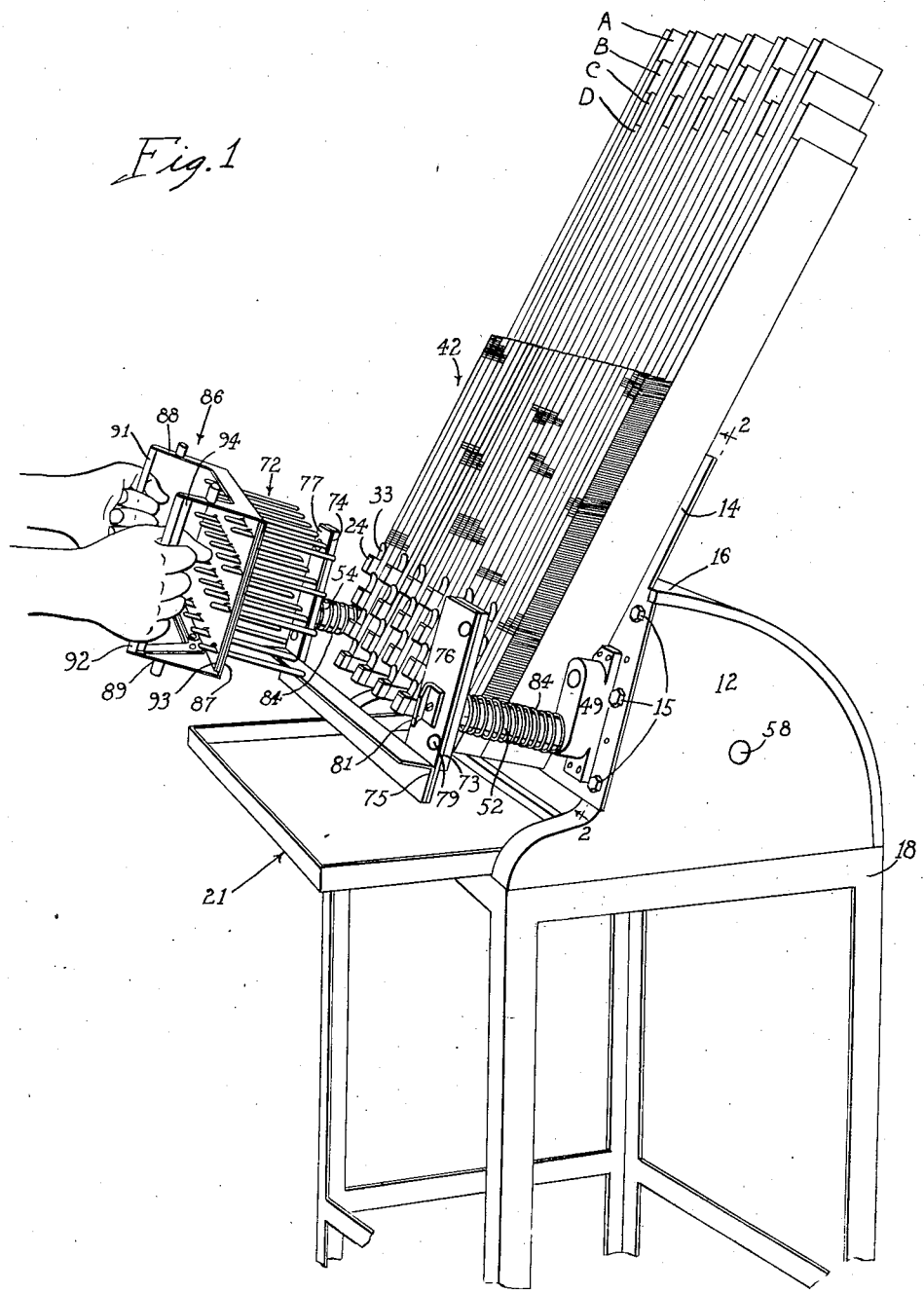
Figure 1 is a perspective view of a stick dispenser embodying my invention showing a loaded stick holder being removed from the machine.

The invention contemplates a dispenser which includes a plurality of magazines for holding the sticks and a plurality of stick feeders located at the bottom of the magazines and equal in number to the stick openings in a conventional stick holder, together with means adapted to be actuated by forcing the stick holder against the dispenser to operate the stick feeders and move the sticks into position in the stick holders coincidentally to movement of the stick holder to the loaded position. As will be seen from Figs. 1 and 2, the device includes a housing which also functions as the frame section of the machine, which housing comprises end plates 11 and 12, in this instance being formed of fairly heavy section cast metal in order to give rigidity to the machine, the end plates being connected by a bottom member 13. A face plate, indicated generally by the numeral 14, interconnects the front edges of the end plates 11 and 12 and is secured thereto by a plurality of cap screws 15. The rear side of the housing is closed by a sheet metal panel indicated generally by the numeral 16 and attached to the end plates and to the bottom plate 13, as best shown in Fig. 2. The bottom plate 13 has openings as indicated at 17 for the purpose of attaching the dispenser to a suitable support such, for example, as the stand indicated at 18 in Figure 1, it being understood that the dispenser can be attached to a separate stand or may be supported on any other convenient supporting means and frequently will be attached directly to the edge of the brine tank. The inner sides of the end plates 11 and 12 are provided with lugs as indicated at 18 which act as stops for the upturned edge 19 of a tray 21 seated on the upper side of the bottom plate 13 and slidable thereon from an extended position, as shown in Figs. 1 and 2, to an inner position disposed entirely on the top of the bottom plate and within the housing, the tray in its extended position serving to catch any sticks which may fall from the feeding mechanism, but more particularly serving as a drip pan to catch lubricant which might drip from lubricated parts presently to be described.

Positioned on the front or outer side of the face plate 14 is a plurality of stick feeder supports each having the form shown in Figs. 4 and 5. These stick feeder supports are arranged in vertical rows along the front of the face plate, as will be seen in Fig. 3, each row consisting of four supports in vertically spaced relationship and each row being spaced from the adjoining row, the space relationship being the same as the space relationship between the openings of a stick holder, as will presently be more fully described. These supports each consist of a bottom bar designated generally by the numeral 24 attached at its end against the face plate 14 by means of a screw as indicated at 25, the bottom bar having a shoulder 27 beyond which is provided a bearing face 28 upon which the ends of the sticks rest as shown in Fig. 4, the face 28 being disposed at an angle with respect to the remainder of the bottom bar so that this face will be substantially horizontal when the support is secured to the face plate at an angle as shown in Fig. 3, in this instance the supports being disposed at an angle of approximately 23° with respect to the vertical. Positioned on opposite sides of the bottom bar 24 are upstanding fillets 29 and 31, the upper ends thereof being flared outwardly and the fillets serving to maintain the sticks in vertical alignment on the base. The forward end of the base also has a strip of metal attached to the sides of the base, a portion thereof extending across the top of the base in parallelism with the face 28, as indicated at 32, and having an upstanding portion 33 adapted to prevent longitudinal movement of the stack of sticks under the feeding operation, as will presently be described.

The upper side 34 of the bottom bar 24 has a notch 35 for the reception of a pin 36 disposed transversely of a magazine indicated generally by the numeral 37. Each of the magazines 37 has parallelly disposed side portions 38 and 39 and a back portion 41, the distance between the side portions being slightly greater than the width of a conventional confection stick, the magazine thus formed serving to hold the confection sticks in a stack as indicated at 42, the sticks being disposed in face to face contact and being disposed endwise in the magazine, as will best be seen from Figs. 4 and 5. The side portions 38 and 39 are of substantially lesser width than the length of the sticks so that the sticks project from the forward edge of the magazine as will be apparent from the figures. The transverse pin 36 serves to space the side portions 38 and 39 and is riveted therebetween by riveted ends 43 and 44 (note particularly Fig. 7), and the pin is disposed adjacent the front edge of the side portions and adjacent one end thereof as will be apparent from Fig. 4. The notch 35 is so located with respect to the plate 14 that the back portion 41 of the magazine rests directly against the plate, as will be seen from Fig. 4, the magazine having, intermediate its ends, a pin 45 receivable in an opening 46 in the plate 14 (see Fig. 2). The pins 36 and 45 thus serve to retain the magazine in the dispenser in upright position and in proper relationship with the bottom bar 24 so that the forward end 47 of the lowermost stick rests upon the face 28 in a position such that when the stick is moved forward it will pass through the feed opening 48 between the member 32 and the surface 28, as shown in Figs. 5 and 6.

It will be understood that the machine is provided with a plurality of magazines, a magazine being seated as described on each of the stick feeder supports and in closely spaced relationship, as will be most apparent from Fig. 3, successive magazines being indicated by the numerals A, B, C, D, etc. It will also be noted from Figs. 2 and 3 that the plate 14 is inclined with respect to the vertical, and that the row of magazines is likewise inclined backwardly so that the stack of sticks will be retained in the magazine by gravity and yet so that the stack of sticks will automatically feed down under their own weight. Likewise, as heretofore described, the magazines slope toward the right viewing Fig. 3 with respect to the vertical at an angle of about 23° and such that an individual magazine can be supplied for each of the stick feeder supports and yet these supports may be maintained in vertical rows of four and the sticks fed therefrom in aligned parallelism.

Adjacent each end of the plate 14 are bearing members 49 and 51, the bearing member 49 having openings for the reception of rods 52 and 53, and the bearing member 51 likewise having openings for the reception of similar rods 54 and 55, the rods being adapted to slide in the bearing openings. The rods 52 and 54 are provided with racks as indicated at 56, and the rods 53 and 55 are provided with racks 57. Extending between the end plates 11 and 12 is a shaft 58 carrying pinions 59 adapted to mesh with the racks 56 and 57, so arranged that when the rods 52 and 54 are moved inwardly facing Fig. 2, the shaft 58 is rotated and the rods 53 and 55 are moved toward the left facing this figure. Movement of the rods is coordinated by a connecting member 61 seated on the rods, the rods 52 and 54 having collars 62 to prevent misplacement of the connecting member 61 through which the rods are adapted to slide. Positioned on the rods 53 and 55 are collars 63 adjustably attached thereto as by set screws or otherwise, these collars carrying a feed plate 64 extending in substantial parallelism with the face plate 14. Attached to the feed plate 64 is a plurality of push rods 65 best shown in detail in Figs. 4 and 5, these rods being equal in number to the number of stick feeders and projecting through openings 66 in the face plate 14. Each of these rods has a flattened upper face 67 terminating in a shoulder 68, which in turn joins a diagonal surface 69 terminating at the end of the rod as indicated at 71, the shoulder 68 acting to engage the end of a stick and being of a height substantially equivalent to or slightly less than the thickness of a stick so that when the rod is pushed forward the shoulder will engage only a single stick. The shoulder 68 of all of the rods is arranged in substantial parallelism so that when the feed plate 64 occupies its rearmost position toward the right facing Figs. 4 and 5, these shoulders will be substantially flush with the forward surface of the face plate 14 as shown in Fig. 4, and the rods are of such length that when the plate 64 is moved toward the left through its feed stroke to the position shown in Fig. 5, a substantial portion of the stick engaged thereby is caused to project beyond the end of the feed support as indicated at 72 (Fig. 5). During this movement the fillets 29 and 31 act to guide the stick and prevent lateral displacement of the stack while the upstanding portion 33 acts to prevent more than a single stick being fed outward by frictional resistance between the bottom and the adjacent stick.

The rods 52 and 54 extend through the bearing members 49 and 51 and extend out beyond the front of the machine, as will be apparent from Figs. 1 and 2, the outer ends of the rods having pads 73 and 74 fixedly attached thereto. Attached to the forward face of the pads 73 and 74 is an alignment member comprising a lower flange 75 having upright arms 76 and 77 attached thereto adapted to seat against the pads 73 and 74, the alignment member being secured to the pads by bolts 78, which bolts are provided with shoulders 79 of slightly greater depth than the thickness of the arms 76 and 77, so that the alignment member is fixed to the pads but is permitted a certain amount of play with respect thereto. Attached to the arms 76 is a guide 81, the guide 81 and the flange member 75 serving as a means of locating the stick holder with respect to the dispenser. Positioned on the rods 52 and 54 between the pads and the bearing members are sleeves 82, and adjacent the pad 73 are collars 83 adjustable on the rods so as to limit the inward movement of the rods, the collars acting against the sleeves for this purpose. Surrounding the rods and the sleeves and collars are springs 84 which urge the rods to the outermost position as indicated in Fig. 2.

In operation, the dispenser is used for the purpose of loading stick holders such as indicated generally at 86 (Figure 1), the stick holder herein shown being that described and claimed in United States Letters Patent No. 2,232,196, to Ralph F. Anderson, issued February 18, 1941, entitled "Stick holder," and comprising a bottom plate 87 having upstanding rods 88 and 89, supporting handles 91 and 92 adjacent the ends thereof, and also including a top plate 93 movable longitudinally with respect to the bottom plate upon actuation of a lever 94, as described in said patent. The lower plate has a plurality of openings 95 provided with upstanding ears 96 which project through openings 97 in the upper plate, which openings are provided with slots 98 within which the sticks are held by a squeezing action between sharpened edges 99 on the upper plate and the upstanding ears 96 as best shown in Figs. 8 and 9. While this particular stick holder is shown, it will be understood that any of the conventional type of stick holders may be employed. The operator grasps the stick holder in open position and places the same on the angle member 75 with one end of the holder against the guide 81. By pressing forward on the stick holder the rods 52 and 54 are moved inward against the compression of the springs 84, causing the rods 53 and 55 to move outwardly carrying with them the feed plate 64 which moves from the position shown in Fig. 4 to that shown in Fig. 5. This movement of the feed plate causes the bottom stick from each magazine to be moved outwardly to the position shown in Fig. 5. Simultaneously with this movement it will be seen that the stick holder approaches the stick feeders, moving from the position indicated in Fig. 4 to that of Fig. 5. The inward movement of the rods in this feeding stroke is terminated by contact of the collars 83 with the ends of sleeves 82, and the extent of this movement may be adjusted within limits by adjusting the position of the collars 83. The handle 94 or other stick gripping mechanism of the stick holder is then actuated to grip the sticks in the holder, and it will be noted that as this occurs, the inner ends of the sticks are still held in the stick feeders as shown in Fig. 5 so that the ends of the sticks adapted to be received in the molds are held in alignment while the sticks are being gripped. Upon release of the pressure against the stick holder the springs 84 cause these parts to return to the starting position, during which operation the ends of the sticks are withdrawn from the stick feeders and the parts of the dispenser are simultaneously repositioned for a successive operation.

As will be seen from Figure 1, the device is such as to materially increase the speed with which the stick holders are loaded for the reason that the operator removes the stick holders from the conveyer and in a single operation and without changing the position of the stick holder in the hands, effectuates its loading and thence simply by swinging the body, is able to insert the holder directly into the mold, these steps being carried out in what is in effect a single operation. The sticks are inserted from the bottom of the stick holder and the sticks are held in aligned parallelsim until after they are gripped in the holder so as to assure the sticks being centered in the mold cavities when the holder is placed on the mold.

It will be seen that the entire forward side of the machine and of the stick feeders are open and accessible to the operator to facilitate the clearing of the stick feeders in case they should become jammed by an excessively warped stick.

Another important feature of the invention resides in the nature of the magazines. Because of their arrangement and the manner in which the magazines are supported, they can be individually removed for cleaning, where permanent magazines are employed, and they may be loaded while in position on the machine or the magazines may be removed for loading. On the other hand, magazines may be employed which constitute shipping packages arranged to be seated on the machine and serving as magazines. The magazines can be loaded by the operator from the working position in front of the machine, and this permits of greater speed in loading and likewise permits the dispenser to be located in positions where the back of the machine is inaccessible.

A still further important advantage of the invention is the inclination of the magazines, the magazines being inclined backwardly as shown in Fig. 2 through an angle sufficient to retain the sticks in the magazine and yet being sufficiently vertical to cause the sticks to be self-feeding. Also the sticks are inclined sidewise as shown in Fig. 3 so that separate magazines may be employed for feeding each of the sticks in each vertically aligned row.

Another important advantage which greatly increases the speed of operation is the fact that a single actuation of the device loads all of the sticks into the holder, or in other words, all of the sticks are loaded at once and the parts are automatically repositioned when the stick holder is removed from the dispenser.

I claim:

1. The combination in a stick dispenser for loading confection sticks into stick holders of a plurality of stick feeders, means for locating a stick holder in alignment with said stick feeders, and means operated by movement of the stick holder between a remote and an approach position for simultaneously pushing a stick from each of said feeders to a point for reception into said holder.

2. The combination in a stick dispenser for loading confection sticks into stick holders of a plurality of stick feeders arranged in upright and laterally spaced rows conforming in spacing to the holes of the stick holder, an upstanding stick magazine for each of said feeders for supplying successive sticks thereto, means for simultaneously pushing a stick endwise partway out of each feeder, means for locating a stick holder in alignment with said stick feeders for reception of the projecting ends of said sticks into said holder upon approach movement thereof, and means operated by movement of the holder between remote and approach positions with respect to the stick feeders for driving the pushing means.

3. The combination in a stick dispenser for loading confection sticks into stick holders of a plurality of stick feeders arranged in upright and laterally spaced rows conforming in spacing to the holes of the stick holder, an upstanding stick magazine for each of said feeders for supplying successive sticks thereto, means for simultaneously pushing a stick endwise partway out of each feeder, means for locating a stick holder in alignment with said stick feeders for reception of the projecting ends of said sticks into said holder upon approach movement thereof, means operated by approach movement of the stick holder toward the stick feeders for driving said stick pushing means to push out a stick, and means for repositioning said pushing means upon return movement of the stick holder.

4. The combination in a stick dispenser for loading confection sticks into stick holders of a plurality of stick feeders arranged in upright and laterally spaced rows, upstanding stick magazines for each of said feeders for supplying successive sticks thereto arranged in upstanding parallel relationship, and in oblique relationship with respect to said rows and at an angle sufficient to provide a spacing of said feeders corresponding to the stick spacing of said holder, and means for pushing sticks from said stick feeders into a stick holder located adjacent thereto.

5. The combination in a stick dispenser for loading confection sticks into stick holders of a plurality of stick feeders arranged in a bank comprising upright and laterally spaced rows, a plurality of stick magazines equal in number to said feeders, each of said magazines having a closed edge and spaced sides for receiving sticks in face to face stacked relationship with the ends thereof abutting said closed edge, said magazines being arranged in parallel relationship in a plane inclined slightly with respect to the vertical to cause the sticks to feed downwardly along said closed edge, said magazines also being sloped obliquely in said plane for engagement of separate magazines with each of the feeders of said upright rows to supply sticks thereto, and means for pushing sticks from said feeders into a stick holder located adjacent thereto.

6. The combination in a stick dispenser for loading confection sticks into stick holders of a plurality of stick supports arranged in a bank comprising upright and laterally spaced rows, a plurality of upright magazines for holding sticks in a stack, means for removably securing said magazines on said supports with the lowermost stick in endwise feeding relationship with said supports, a plurality of pushers positioned to engage and simultaneously push the sticks endwise along said supports to cause an end portion of the sticks to project therefrom, a stick holder guide against which the bottom of a stick holder is manually placed to align the stick holder with respect to said supports, and means operated by forcing the stick holder toward said supports to a point for reception of said sticks, for moving said pushers to push the ends of the sticks out of said supports.

7. The combination in a stick dispenser for loading confection sticks into stick holders of a plurality of stick feeders arranged in a bank, an upright stick holder guide disposed in front of said bank for the reception of the bottom of a stick holder thereagainst to locate the holder in alignment with said feeders, said guide being movable in response to force applied to the stick holder between a remote position and an approach position with said holder in close proximity to said feeders, and means driven by movement of said guide for simultaneously pushing a stick from each of said stick feeders for reception in said stick holder.

8. The combination in a stick dispenser for loading confection sticks into stick holders of a plurality of stick feeders arranged in an upright bank, an upright stick holder guide disposed in front of said bank for locating the bottom of a stick holder pressed thereagainst in alignment with said feeders and for guiding movement thereof toward and away from said bank, a plurality of pushers for pushing sticks from each of said feeders, and means operated by forcing said stick holder toward said bank for actuating said pushers to push the stick out of each of said feeders and into engagement with said stick holder as it moves toward said bank.

9. The combination recited in claim 8 wherein spring means is provided for returning said pushers in response to movement of the stick holder away from said bank.

10. The combination in a stick dispenser for loading confection sticks into stick holders of an upright bank of stick feeders arranged in upright and laterally spaced rows, a plurality of stick magazines equal in number to said feeders, each of said magazines having a closed rear edge and spaced sides for receiving sticks endwise in face to face stacked relationship with one end thereof abutting said closed edge and the other end projecting from the magazines, said magazines being arranged in parallel relationship in a plane inclined slightly with respect to the vertical to cause the sticks to feed downwardly under gravity in contact with said closed edge, said magazines also being sloped obliquely in said plane for engagement of separate magazines with each of the feeders of said upright rows to supply sticks thereto, a U-shaped holder guide disposed in front of said bank in parallelism therewith for locating the bottom of the stick holder in alignment with said feeders and for guiding movement thereof toward and away from said bank, the sides of said guide being disposed on opposite ends of said bank to leave the stick feeders and the open edges of said magazines unobstructed for access thereto in supplying sticks to the magazines and repairing the stick feeders, and means connected to the sides of said guide for pushing sticks out of said feeders and into engagement with said stick holder as it moves toward said bank.

11. The combination recited in claim 10 wherein said last mentioned means comprises racks positioned to be moved endwise upon movement of the guide toward said bank, pushers at each of said feeders for moving the bottom stick of each magazine endwise from said feeders, and rack and pinion means disposed between said rack and said pushers.

12. The combination recited in claim 10 wherein the last mentioned means is connected to the sides of said guide by means which permits limited tilting movement of the guide with respect to the feeders to facilitate alignment of the holder therewith.

13. The combination in a stick dispenser for loading confection sticks into stick holders comprising an upright bank of stick feeders, an upright stick holder guide disposed in front of said bank to serve as a guide in manually locating said holder in alignment with said feeders, a rack for supporting said guide for movement of the guide and the holder toward said bank when the holder is pushed against the guide to a position adjacent the bank for reception of sticks in said holder, rack and pinion means operated by said rack during said movement for simultaneously pushing sticks from each of said feeders into said holder, and spring means for returning said guide to return said rack and pinion means to original position.

14. The combination in a stick dispenser for loading confection sticks into stick holders comprising a bank of stick feeders equal in number to the sticks carried by said holder, a stick holder guide disposed in parallelism with said bank to locate the holder, the guide and holder being movable toward said bank into an approach position in close proximity to said feeders to receive the ends of the sticks into said holder and movable away from said bank to withdraw sticks from said feeders, and means operated by movement of said guide for pushing a stick endwise partway out from each of said feeders for reception in said holder, the other end of said sticks being retained in said feeders while the projecting ends are secured in said feeders whereby to insure accurate relative location of said other ends.

15. The combination in a stick dispenser for loading confection sticks into stick holders comprising an upright bank of stick feeders, an upright stick holder guide disposed in front of said bank to serve as a guide in manually locating said holder in alignment with said feeders, a rack for supporting said guide for movement of the guide and the stick holder toward said bank when the holder is pushed against the guide to a position adjacent said bank and for return movement, spring means for returning said rack and guide, and means operated by movement of said rack to simultaneously push one end of a stick out of each of said feeders to be received by said holder whereby the other end of said stick is held in the feeder when the sticks are gripped in said holder.

16. In combination in a stick dispenser for loading confection sticks into stick holders, of an upright face plate extending upwardly and backwardly, a plurality of stick supports secured to said plate and projecting endwise therefrom shaped to receive a confection stick thereon in endwise relation to said plate, stick magazines projecting upwardly from each of said supports and seated thereover, means on said magazines for engaging said plate and said supports for removably supporting the stick magazines in feeding relationship with the supports, a plurality of stick pushers passing through said plate and disposed above said supports shaped to engage the lowermost stick in each magazine and push the same endwise along said supports upon forward movement of said pushers, means for moving said pushers in unison, and means for guiding a stick holder into position adjacent said supports to receive the sticks therefrom.

RALPH F. ANDERSON.